United States Patent
Matsubaguchi et al.

(10) Patent No.: US 7,005,203 B2
(45) Date of Patent: Feb. 28, 2006

(54) MAGNETIC RECORDING MEDIUM

(75) Inventors: Satoshi Matsubaguchi, Odawara (JP); Yuichiro Murayama, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 53 days.

(21) Appl. No.: 10/653,932

(22) Filed: Sep. 4, 2003

(65) Prior Publication Data

US 2004/0106011 A1    Jun. 3, 2004

(30) Foreign Application Priority Data

Sep. 5, 2002    (JP)    ............................. 2002-260301

(51) Int. Cl.
*G11B 5/702*    (2006.01)

(52) U.S. Cl. ................................ 428/839.4; 428/840.5
(58) Field of Classification Search .......... 428/694 BS, 428/694 BU, 694 BA, 336, 839.4, 840.5
See application file for complete search history.

(56) References Cited

U.S. PATENT DOCUMENTS 5,935,703 A * 8/1999 Deno et al. ................. 428/336
6,224,967 B1 * 5/2001 Murayama et al. ......... 428/216

* cited by examiner

Primary Examiner—Stevan A. Resan
(74) Attorney, Agent, or Firm—Sughrue Mion, PLLC

(57) ABSTRACT

Provided is a magnetic recording medium that exhibits excellent electromagnetic characteristics especially in recording and reproducing systems using an MR head, as well as has excellent long-term preservation property. The magnetic recording medium comprises a lower layer comprising a nonmagnetic powder or a ferromagnetic powder and a binder and at least one magnetic layer thereover comprising a ferromagnetic powder and a binder on a support. Said binder comprised in the lower layer and/or magnetic layer comprises a polyurethane, said polyurethane is polyurethane (1) prepared from a chain extending agent, an organic diisocyanate, and a polyester polyol which comprises a dibasic acid component and a diol component, wherein the dibasic acid component comprises an aliphatic dibasic acid component and 70 molar percent or more of the diol component is derived from a diol having an alkyl branched side chain comprising two or more carbon atoms without a ring structure, or said polyurethane is polyurethane (2) prepared from a chain extending agent which comprises an alkyl branched aliphatic diol comprising three or more of total carbon atoms in a branched side chain per molecule, an organic diisocyanate, and a polyester polyol which comprises a dibasic acid component and a diol component, wherein the dibasic acid component comprises an aliphatic dibasic acid component and 70 molar percent or more of the diol component is derived from an alkyl branched aliphatic diol having a branched side chain of which total carbon atoms per molecule is two or more, and magnitude of saturation magnetic flux density ($\phi$m) ranges from 150 to 400 G·$\mu$m.

18 Claims, No Drawings

MAGNETIC RECORDING MEDIUM

FIELD OF THE INVENTION

The present invention relates to a magnetic recording medium having excellent dispersibility, coating smoothness and electromagnetic characteristics as well as having excellent long-term preservation property.

BACKGROUND OF THE INVENTION

Magnetic recording media are widely employed in recording tapes, video tapes, floppy disks, and the like. In magnetic recording media, a magnetic layer in which a ferromagnetic powder is dispersed in a binder is laminated on a support.

The magnetic recording media must have a variety of high-level characteristics, such as electromagnetic characteristics, running durability, and running performance. That is, in audio tapes used to record and reproduce music, a greater ability to reproduce sound sources is required. Further, good electromagnetic characteristics such as the ability to reproduce a source image are required of video tapes. In addition to possessing such good electromagnetic characteristics, magnetic recording media must also have good running durability. The improvement of binder dispersibility has been carried out as one approach for achieving good running durability.

For example, Japanese Unexamined Patent Publication (KOKAI) Heisei No. 11-39639 discloses polyester polyurethane that contains polyester polyol comprising an aliphatic dibasic acid and a specific branched aliphatic diol, and describes the objectives of improving the dispersion stability of powder, improving output, preventing head fouling, suppressing increased dropout (DO), and improving long-term preservation properties (improvement in the $\mu$ value (coefficient of friction) after one week at 60° C. dry). Japanese Unexamined Patent Publication (KOKAI) Heisei No. 11-39639 is characterized by the use of high-strength, highly dispersible polyurethane as binder. However, it presents problems in that it requires the additional use of vinyl chloride resin incorporating polar groups to adjust the viscosity of the coating liquid and the physical properties of the tape, head corrosion is caused by the generation of hydrochloric acid, and the environment is compromised when the magnetic recording medium is discarded.

As environmentally safe binders, Japanese Unexamined Patent Publication (KOKAI) Heisei No. 5-307734 discloses a binder comprising just two or more polyester urethanes having different Tg values, and Japanese Unexamined Patent Publication (KOKAI) Heisei No. 6-52539 discloses a binder comprising just polyester urethane with the low molecular weight component removed to achieve a Tg of 60 to 80° C. Although Japanese Unexamined Patent Publications (KOKAI) Heisei No. 5-307734 and Heisei No. 6-52539 provide magnetic recording media that are environmentally safe, the disclosed polyurethane resins afford inadequate dispersibility, smoothness, and electromagnetic characteristics. Preservation properties are also inadequate.

When magnetic recording media are employed as the data media of recent years that have been required to deliver high capacity, high speed, and high reliability, the trace amounts of hydrochloric acid gas that are generated by the magnetic recording media are known to have the potential not only to adversely affect the preservation properties of the tape but also to cause head corrosion. Deterioration in characteristics due to corrosion is of particular concern in the magnetoresistive (MR) heads employed in computer data recording systems, and the handling of such corrosion has become an issue.

When a tape is stored for an extended period at high temperature under high humidity, the degradation of materials in a tape by hydrochloric acid gas, such as the generation of fatty acids through the hydrolysis of ester lubricants causes. The resulting fatty acid sometimes transfers to the surface of the magnetic layer to precipitate and causes crystallization. Since the recording density becomes higher than that of prior art, the effects of even minute quantities of foreign matter present a significant problem.

Taking this problem into consideration, Japanese Unexamined Patent Publication (KOKAI) No. 2001-176052 proposes a magnetic recording medium employing a binder containing polyurethane of prescribed structure and specifies the chlorine content of the magnetic recording medium. However, although the magnetic recording medium described in Japanese Unexamined Patent Publication (KOKAI) No. 2001-176052 affords good coating smoothness and long-term preservation property, it does not provide adequate reproduction output and requires further improvement in electromagnetic characteristics, particularly in recording and reproduction systems in which MR heads are employed.

Therefore, it is an object of the present invention to provide a magnetic recording medium that exhibits excellent electromagnetic characteristics especially in recording and reproducing systems using an MR head, as well as has excellent long-term preservation property.

SUMMARY OF THE INVENTION

The present inventors had conducted extensive researches to achieve the aforementioned object. As a result, they discovered that the aforementioned object could be achieved by setting the saturation magnetic flux density ($\phi$m) within a certain range as well as by using a binder comprising a polyurethane with excellent dispersibility. The present invention was devised on that basis.

That is, the object of the present invention mentioned above is achieved by:

a magnetic recording medium comprising a lower layer comprising a nonmagnetic powder or a ferromagnetic powder and a binder and at least one magnetic layer thereover comprising a ferromagnetic powder and a binder on a support, wherein said binder comprised in the lower layer and/or magnetic layer comprises a polyurethane, said polyurethane is polyurethane (1) prepared from a chain extending agent, an organic diisocyanate, and a polyester polyol which comprises a dibasic acid component and a diol component, wherein the dibasic acid component comprises an aliphatic dibasic acid component and 70 molar percent or more of the diol component is derived from a diol having an alkyl branched side chain comprising two or more carbon atoms without a ring structure, or said polyurethane is polyurethane (2) prepared from a chain extending agent which comprises an alkyl branched aliphatic diol comprising three or more of total carbon atoms in a branched side chain per molecule, an organic diisocyanate, and a polyester polyol which comprises a dibasic acid component and a diol component, wherein the dibasic acid component comprises an aliphatic dibasic acid component and 70 molar percent or more of the diol component is derived from an alkyl branched aliphatic diol having a branched side chain of which total carbon atoms per molecule is two or more, and magnitude of saturation magnetic flux density ($\phi$m) ranges from 150 to 400 G·$\mu$m.

In the present invention, (1) the magnetic layer and/or nonmagnetic layer preferably comprises an esters lubricant; and (2) the esters lubricant preferably has a melting point of equal to or less than 10° C.

The magnetic recording medium of the present invention is characterized in that the magnitude of the saturation magnetic flux density $\phi$m falls within a range of 150 to 400 G·$\mu$m, and in that the binder of the magnetic layer and/or lower layer comprises a polyurethane of prescribed structure. The mechanism of the present invention will be described below.

Magnetoresistive (MR) magnetic heads produce several times the reproduction output of inductive magnetic heads. Since magnetoresistive heads do not employ induction coils, device noise such as impedance noise is greatly reduced. Therefore, improvement in high-density recording and reproduction characteristics can be anticipated, and thus the scope of use of magnetoresistive heads has been increasing in recent years. Since the output of an MR head is based on the magnitude of the saturation magnetic flux density $\phi$m, there is an advantage in that much greater sensitivity is achieved than in MIG heads, which output is based on temporal change in the saturation magnetic flux density $\phi$m. However, there is a problem in that once an MR head has been saturated, good output cannot be achieved and electromagnetic characteristics deteriorate.

Accordingly, the present inventors had conducted extensive research into achieving good electromagnetic characteristics in recording and reproduction systems employing MR heads, resulting in the discovery that by specifying a saturation magnetic flux density $\phi$m falling within a range of 150 to 400 G·$\mu$m, it was possible to avoid head saturation and achieve good electromagnetic characteristics.

On the other hand, the saturation magnetic flux density $\phi$m is controlled by the thickness and fill rate of the magnetic layer. In magnetic layers of identical fill rates, the magnetic layer thickness and the saturation magnetic flux density $\phi$m vary proportionately. When the magnetic layer is made thin enough to achieve a saturation magnetic flux density $\phi$m falling within a range of 150 to 400 G·$\mu$m and there is significant turbulence at the interface between the lower layer and the magnetic layer, the interface turbulence affects the surface properties of the outermost surface of the medium, making it impossible to obtain good surface smoothness and precluding the achievement of good electromagnetic characteristics.

Accordingly, in the present invention, the saturation magnetic flux density $\phi$m is specified within the above-stated range and binder containing polyurethane of prescribed structure and good dispersibility is employed in the magnetic layer and/or lower layer. Thus, particularly in recording and reproduction systems employing MR heads, a magnetic recording medium affording good electromagnetic characteristics can be achieved.

The magnetic recording medium of the present invention will be described in detail below.

[Saturation Magnetic Flux Density $\phi$m]

In the magnetic recording medium of the present invention, the saturation magnetic flux density $\phi$m ranges from 150 to 400 G·$\mu$m, preferably from 175 to 375 G·$\mu$m, and more preferably from 200 to 350 G·$\mu$m. When the saturation magnetic flux density $\phi$m is less than 150 G·$\mu$m, adequate output cannot be obtained and the C/N ratio deteriorates. Conversely, when the saturation magnetic flux density $\phi$m exceeds 400 G·$\mu$m, the head saturates and good electromagnetic characteristics cannot be obtained.

The saturation magnetic flux density $\phi$m can be controlled through the thickness and fill rate of the magnetic layer. For identical fill rates of the magnetic layer, that is, for identical types and quantities of magnetic material and binder processed under identical conditions, the saturation magnetic flux density $\phi$m is proportional to the thickness of the magnetic layer. Accordingly, in the present invention, the saturation magnetic flux density $\phi$m can be controlled through the magnetic layer thickness and fill rate. For example, the thickness of the magnetic layer can be set to 0.02 to 0.08 $\mu$m, preferably 0.03 to 0.07 $\mu$m, and the fill rate of the magnetic layer can be set to a magnetic flux density Bm of 3,000 to 4,500 Gauss to achieve a saturation magnetic flux density of 150 to 400 G·$\mu$m.

[Polyurethane]

In the present invention, a binder comprising a polyurethane is employed in the lower layer and/or magnetic layer.

The polyurethane is;

polyurethane (1) prepared from a chain extending agent, an organic diisocyanate, and a polyester polyol which comprises a dibasic acid component and a diol component, wherein the dibasic acid component comprises an aliphatic dibasic acid component and 70 molar percent or more of the diol component is derived from a diol having an alkyl branched side chain comprising two or more carbon atoms without a ring structure, or polyurethane (2) prepared from a chain extending agent which comprises an alkyl branched aliphatic diol comprising three or more of total carbon atoms in a branched side chain per molecule, an organic diisocyanate, and a polyester polyol which comprises a dibasic acid component and a diol component, wherein the dibasic acid component comprises an aliphatic dibasic acid component and 70 molar percent or more of the diol component is derived from an alkyl branched aliphatic diol having a branched side chain of which total carbon atoms per molecule is two or more.

Since the polyurethane does not contain a polyol with a ring structure such as an aromatic ring or cyclohexane ring that is disadvantageous to solubility in solvents, but does have branched side chains in the diol, the association of urethane bonds and ester bonds is stereoscopically prevented, thus reducing the interaction between molecules and improving solubility in solvent. In particular, when the binder containing the above-described polyurethane is employed in the magnetic layer, the dispersibility of magnetic material tending to aggregate due to magnetic energy is improved, yielding good coating smoothness.

The polyurethane employed in the present invention is prepared from a polyester polyol, a chain-extending agent, and an organic diisocyanate. The polyester polyol comprises;

(1) a dibasic acid component and a diol component, wherein the dibasic acid component comprises an aliphatic dibasic acid component and 70 molar percent or more of the diol component is derived from a diol having an alkyl branched side chain comprising two or more carbon atoms without a ring structure or (2) a dibasic acid component and a diol component, wherein the dibasic acid component comprises an aliphatic dibasic acid component and 70 molar percent or more of the diol component is derived from an alkyl branched aliphatic diol having a branched side chain of which total carbon atoms per molecule is two or more.

The polyurethane comprising at least the polyester polyol (1) above will be referred to as polyurethane (1) below. The polyurethane comprising the polyester polyol (2) above and a chain extending agent comprising an alkyl branched aliphatic diol comprising three or more of total carbon atoms in a branched side chain per molecule will be referred to as polyurethane (2) below. The binder employed in the magnetic layer and/or lower layer in the present invention comprises polyurethane (1) and/or polyurethane (2).

The diol component of the polyester polyol (1) above, comprising an alkyl branched side chain comprising two or more carbon atoms and not comprising a ring structure, will be referred to as diol (A) below. Diol (A) must comprise at least one alkyl branched side chain comprising two or more carbon atoms, and may comprise a methyl group, and other groups such as halogen atoms, alkoxy groups, and the like. The alkyl branched side chain preferably comprises 2 to 4 carbon atoms, and diol (A) preferably has 1 or 2 branched side chains. The main chain of diol (A) preferably comprises 3 to 6 carbon atoms. Diol (A) constitutes 70 molar percent or more, preferably 80 to 100 molar percent, of the diol component of the polyester polyol. Examples of diol components other than diol (A) are straight-chain diols having 2 to 9 carbon atoms, cyclic diols having 6 to 24 carbon atoms, and the like.

The alkyl branched aliphatic diol of polyester polyol (2) above, having a branched side chain of which total carbon atoms per molecule is two or more, will be referred to as diol (B) below. Diol (B) must comprise two or more of total carbon atoms in the alkyl branched side chain, and may also comprise groups in addition to the alkyl branched side chain. As needed, groups with ring structures, such as alicyclic groups, as well as other groups such as halogen atoms, alkoxy groups, and the like may be present. The preferred example of the alkyl branched side chain is a methyl group. Diol (B) preferably comprises 2 to 3 methyl groups. The main chain of diol (B) preferably comprises 3 to 6 carbon atoms. Further, diol (B) constitutes 70 molar percent or more, preferably from 80 to 100 molar percent, of the diol component of the polyester polyol. Examples of diol components other than diol (B) are straight-chain diols having 2 to 9 carbon atoms, cyclic diols having 6 to 24 carbon atoms, and the like.

The alkyl branched aliphatic diol comprising three or more of total carbon atoms in a branched side chain per molecule that is employed as the chain-extending agent of polyurethane (2) will be referred to as diol (C) below. Diol (C) must comprise three or more of total carbon atoms in the alkyl branched side chain, and may also comprise groups in addition to the alkyl branched side chain. Similar to diol (B), as needed, it may comprise groups with ring structures, such as alicyclic groups, as well as other groups such as halogen atoms, alkoxy groups, and the like. Examples of preferred alkyl branched side chains are ethyl groups, propyl groups, and butyl groups. Diol (C) preferably comprises 2 to 3 of these groups. The main chain of diol (C) preferably comprises 3 to 6 carbon atoms.

Examples of diol (A) and diol (B) which can be used in the present invention are 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, Among them, examples of preferred diol (A) are 2-ethyl-1,3-hexanediol, 2-butyl-1,3-propanediol, and 2,2-diethyl-1,3-propanediol.

Examples of preferred diol (B) are 2,2-dimethyl-1,3-propanediol and 3,3-dimethyl-1,5-pentanediol.

Examples of diol (C) are 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl- 1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-propyl-1,6-hexanediol, 2-butyl-1,6-hexanediol, 5-propyl-1,9-nonanediol and 5-butyl-1,9-nonanediol. Among them, preferred examples are 2-ethyl-2-butyl-1,3-propanediol and 2,2-diethyl-1,3-propanediol.

In the present invention, aliphatic dibasic acids comprising 4 to 10 carbon atoms are preferred examples suited to use as a constituent of the polyester polyol of the above-described polyurethane. The aliphatic component of the aliphatic dibasic acid refers to the chain structure; oxygen, sulfur, and other heteroatoms may also be comprised in the main chain. Specific examples are succinic acid, adipic acid, azelaic acid, sebacic acid, malonic acid, glutaric acid, pimelic acid, and suberic acid. Preferred examples are succinic acid, adipic acid, and sebacic acid.

The content of the aliphatic dibasic acid in the total dibasic acid component of the polyester polyol is preferably equal to or greater than 70 molar percent, more preferably from 80 to 100 molar percent. At equal to or greater than 70 molar percent, the dibasic acid component having a ring structure, such as aromatic dibasic acid, is essentially reduced, improving solubility in solvent and yielding good dispersibility.

The organic diisocyanate that is a constituent of polyurethanes (1) and (2) will be described next. Examples of organic diisocyanates are 2,4-tolylenediisocyanate, 2,6-tolylenediisocyanate, xylene-1,4-diisocyanate, xylene-1,3-diisocyanate, 4,4'-diphenylmethane diisocyanate, 4,4-diphenylether diisocyanate, 2-nitrodiphenyl-4,4'-diisocynate, 2,2'-diphenylpropane-4,4'-diisocyanate, 4,4'-diphenylpropane diisocyanate, m-phenylene diisocyanate, p-phenylene diisocyanate, naphthylene-1,4-diisocyante, naphthylene -1,5-diisocyanate, 3,3'-dimethoxydiphenyl-4,4'-diisocyanate, and other aromatic diisocyanates; tetramethylene diisocyanate, hexamethylene diisocyanate, lysine diisocyanate, and other aliphatic diisocyanates; and isophorone diisocyanate, hydrogenated tolylenediisocyanate, hydrogenated diphenylmethane diisocyanate, and other alicyclic diisocyanates. Aromatic diisocyanates are preferred, with 4,4-diphenylmethane diisocyanate, 2,2-tolylenediisocyanate, p-phenylene diisocyanate, and isophorone diisocyanate being further preferred.

The molecular weight of the polyurethane, as a weight average molecular weight, preferably ranges from 30,000 to 70,000, more preferably from 40,000 to 60,000. At equal to or higher than 30,000, high coating strength and good durability are achieved. At equal to or less than 70,000, high solubility in solvent and good dispersibility are achieved.

The glass transition temperature (Tg) of the polyurethane preferably ranges from 50 to 150° C., more preferably from 70 to 120° C., further preferably from 80 to 100° C. At equal to or higher than 50° C., the coating strength at a high temperature is high and excellent durability and preservation property can be achieved. At equal to or less than 150° C., calendar moldability is high and electromagnetic characteristics are improved.

Polyurethanes (1) and (2) preferably comprise polar groups. Polar groups selected from the group consisting of —$SO_3M$, —$OSO_3M$, —COOM, —P=O(OM)$_2$, —O—P=O(OM)$_2$, —$NR_2$, and —$N^+R_2R'COO^-$ (where M denotes a hydrogen atom, alkali metal, or ammonium, and R and R' denote alkyl groups with 1 to 12 carbon atoms) may be employed. Among them, —$SO_3M$, —$OSO_3M$, —P=O(OM)$_2$, and —COOM are preferred and —$SO_3M$ and —$OSO_3M$ are of even greater preference. The polar group content preferably ranges from $1 \times 10^{-5}$ eq/g to $2 \times 10^{-4}$ eq/g. At equal to or greater than $1 \times 10^{-5}$ eq/g, adsorption onto the magnetic material tends to be good and dispersibility tends to improve. At equal to or less than $2 \times 10^{-4}$ eq/g, solubility in solvent tends to be good and dispersibility tends to improve.

The polar group may be introduced into the diol component, dibasic acid component, or some polyol other than the polyester polyol employed in the present invention to obtain a monomer that is polymerized to obtain polyurethane (1) or (2), or the polar group may be introduced into the resin that is produced.

Polyol components that may be additionally employed include polyester polyols, polyether polyols, polyetherester polyols, and polycarbonate polyols. Specific examples of the above-mentioned monomer comprising a polar group are polar group-comprising polyester polyols obtained by dehydration condensation with sodium 5-sulfoisophthalate, potassium 5-isophthalate, sodium sulfoterephthalate, potassium terephthalate, sodium 2-sulfo-1,4-butanediol, potassium 2-sulfo-1,4-butanediol, sodium bis(2-hydroxyethyl) phosphinate, dimethylol propionate, sodium dimethylol propionate, and sodium sulfosuccinate, or other glycols or dicarboxylic acids; polar group-comprising polyester polyols obtained by ring opening polymerization of a lactone such as ε-caprolactone using the above polar group-containing diol as an initiator; and polar-group comprising polyether diols obtained by adding ethylene oxide, propylene oxide, or some other alkylene oxide to a polar group-comprising diol.

The concentration of urethane groups in polyurethane (1) and (2) preferably ranges from 3.0 to 4.0 mmol/g, more preferably from 3.3 to 3.7 mmol/g. At equal to or greater than 3.0 mmol/g, the glass transition temperature (Tg) of the coating is high and durability is good. At equal to or less than 4.0 mmol/g, solubility in solvent is good and dispersibility improves. Since polyols can no longer be contained when the urethane group concentration exceeds 4.0 mmol/g, problems such as difficultly in adjusting the molecular weight tend to be encountered in synthesis.

The OH group content of polyurethanes (1) and (2) is preferably from 3 to 20 groups, more preferably from 3 to 15 groups, per molecule. An OH group content of equal to or greater than 3 groups per molecule improves reactivity with the isocyanate curing agent, increases coating strength, and yields good durability. Further, an OH group content of equal to or less than 15 groups per molecule increases solubility in solvent and yields good dispersibility.

In the present invention, polyurethane (1) or (2) is incorporated as at least a binder component into the lower layer and/or the magnetic layer. The binder employed in the lower layer and/or the magnetic layer may have a composition comprising just polyurethane (1) or (2), further comprise other resins, or, as is usually the case, comprise a curing agent such as polyisocyanate.

Vinyl chloride resins are examples of resins that may be additionally employed. The degree of polymerization of the vinyl chloride resin preferably ranges from 100 to 500, more preferably from 150 to 400, and further preferably from 200 to 300. The vinyl chloride resin may be obtained by copolymerization of vinyl monomers such as vinyl acetate, vinyl alcohol, vinylidene chloride, and acrylonitrile.

Among them, a copolymer comprising vinyl chloride and vinyl acetate is preferred as the vinyl chloride resin. When vinyl acetate is incorporated into the copolymer in an amount of 1 to 15 weight percent, the compatibility of polyurethanes (1) and (2) increases and the viscosity of the coating liquid at high shear rates decreases, resulting in the effect of producing an extremely smooth magnetic layer.

The vinyl chloride resin preferably comprises the same polar group as the polyurethane resin of the present invention. The content of the polar group preferably ranges from $1 \times 10^{-5}$ to $1 \times 10^{-3}$ eq/g. Within this range, good dispersibility can be achieved at a suitable viscosity. Further, the vinyl chloride resin preferably comprises epoxy groups. The epoxy group content preferably ranges from $1 \times 10^{-4}$ to $1 \times 10^{-2}$ eq/g, more preferably from $5 \times 10^{-4}$ to $2 \times 10^{-3}$ eq/g.

Further, the vinyl chloride resin preferably comprises OH groups. The incorporation of OH groups into the vinyl chloride resin is desirable because it fosters reaction with the isocyanate curing agent to form a crosslinked structure, improving mechanical strength. OH groups are preferably introduced by bonding through a hydrocarbon chain or polyalkyleneglycol chain to the main chain rather than by direct bonding to the main chain of the polymer in the manner of vinyl alcohol to achieve better curing properties. Primary and secondary OH groups are desirable. OH groups can be introduced into the vinyl chloride resin by copolymerization with 2-hydroxypropyl (meth)acrylate, 3-hydroxypropyl (meth)acrylate, 4-hydroxybutyl (meth)acrylate, 4-hydroxybutylallylether, or some other vinyl monomer.

The OH group content in the vinyl chloride resin preferably ranges from $1 \times 10^{-4}$ to $5 \times 10^{-3}$ eq/g, more preferably from $2 \times 10^{-4}$ to $2 \times 10^{-3}$ eq/g. The vinyl chloride resin can usually comprise 0 to 15 weight percent of another copolymerizable monomer. Examples of such copolymerizable monomers are (meth)acrylic acid alkyl esters, carboxylic acid vinyl esters, allyl ethers, styrene, glycidyl (meth)acrylate, 3-hydroxypropyl methacrylate, 2-hydroxypropyl methacrylate, 3-hydroxypropylallylether, and other vinyl monomers.

Further examples of binder components additionally employed in the present invention are cellulose derivatives such as nitrocellulose resin, acrylic resin, polyvinylacetal resin, polyvinylbutyral resin, epoxy resin, and phenoxy resin. These may be employed singly or in combination. The quantity added should be adjusted so that the magnetic recording medium contains little chlorine when employing an additional synthetic resin, and polyurethane (1) or (2) is preferably incorporated into the binder in a proportion of 50 to 100 weight percent, more preferably from 70 to 100 weight percent, and particularly preferably from 80 to 100 weight percent in the present invention. At equal to or greater than 50 weight percent, good dispersibility is achieved.

The above resin additionally employed in the present invention preferably contains polar groups. The polar groups and quantities contained are as set forth above for polyurethane (1) and (2), if there is no specific description. When additionally employing vinyl chloride resin, the composition of the binder as a weight ratio of polyurethane (1) or (2) to the polar group-containing vinyl chloride resin is preferably from 85/15 to 100/0, more preferably from 90/10 to 100/0, and particularly preferably from 95/5 to 100/0. Within this range, the magnetic recording medium contains little chlorine, there is not a problem of degradation of the medium by hydrochloric gas during long periods of storage or of head corrosion due to hydrochloric gas, and an environmentally safe magnetic recording medium is obtained.

The curing agent that is a component of the binder may be a polyisocyanate curing agent, epoxy curing agent, or the like, with polyisocyanate curing agents being preferred. Examples of polyisocyanate curing agents are the above-described organic diisocyanate compounds serving as a constituent of the polyurethane resin of the present invention and the reaction products of the above-described diisocyanates with trimethylolpropane, glycerin, and other polyhydric alcohols, such as the reaction product of 3 moles of tolylenediisocyanate with 1 mol of trimethylolpropane (for example, Desmodule L-75 (made by Bayer Corp.)), the reaction product of 3 moles of xylylene diisocyanate or hexamethylene diisocyanate with 1 mol of trimethylolpropane, and the buret addition compound of 3 moles of hexamethylene diisocyanate. Further examples are trimers, pentamers, and heptamers of tolylenediisocyanate, hexamethylene diisocyanate, and the like as isocyanurate-type polyisocyanates obtained by polymerizing diisocyanate compounds. A still further example is polymeric MDI, which is a polymer of MDI (4,4-diphenylmethanediisocyanate). The polyisocyanate compound contained in the magnetic layer preferably constitutes 10 to 50 weight percent, more preferably 20 to 40 weight percent, of the binder.

Further, when curing by means of electron beam irradiation, compounds having reactive double bonds such as urethane acrylate may be employed. The combined weight of the resin component and curing agent (that is, of the binder) is preferably from 15 to 40 weight parts, more preferably from 20 to 30 weight parts, per 100 weight parts of ferromagnetic powder.

The ferromagnetic powder used in the magnetic recording medium of the present invention may be a ferromagnetic iron oxide, a cobalt-containing ferromagnetic iron oxide or a ferromagnetic alloy powder having a specific surface area ($S_{BET}$) usually ranging from 40 to 80 $m^2/g$, preferably from 50 to 70 $m^2/g$. The crystallite size usually ranges from 12 to 25 nm, preferably from 13 to 22 nm, particularly preferably from 14 to 20 nm.

Examples of ferromagnetic metal powders are Fe, Ni, Fe—Co, Fe—Ni, Co—Ni, and Co—Ni—Fe. In the present invention, a ferromagnetic metal powder comprised primarily of Fe, which is usually employed in high-density recording media, is preferable for use; Fe is usually employed in a proportion of equal to or greater than 50 atomic percent, preferably 55 to 90 atomic percent, of the ferromagnetic metal powder. Y, Co, and the like are elements preferably employed in combination with Fe. In the present invention, these elements are particularly desirable because they increase the saturation magnetization σs and are capable of forming dense, thin oxide films. The yttrium content of the ferromagnetic powder, denoted as the ratio of yttrium atoms to iron atoms (Y/Fe), is preferably from 0.5 to 20 atomic percent, more preferably from 5 to 10 atomic percent. At equal to or greater than 0.5 atomic percent, a high σs can be achieved in the ferromagnetic powder, magnetic characteristics are improved, and good electromagnetic characteristics are achieved. At equal to or less than 20 atomic percent, the high iron content improves magnetic characteristics and yields good electromagnetic characteristics.

Furthermore, it may contain aluminum, silicon, sulfur, scandium, titanium, vanadium, chromium, manganese, copper, zinc, molybdenum, rhodium, palladium, gold, tin, antimony, boron, barium, tantalum, tungsten, rhenium, lead, phosphorus, lanthanum, cerium, praseodymium, neodymium, tellurium, bismuth and the like. They may be contained in a total amount of, usually, equal to or less than 20 atomic percent, preferably from 7 to 20 atomic percent with respect to 100 atomic percent of iron.

In a ferromagnetic metal powder comprising Y, the magnetic energy between particles is strong and dispersion is difficult. However, dispersion using the above-described binder containing polyurethane (1) or (2) above yields a magnetic recording medium with good electromagnetic characteristics and running durability.

Manufacturing methods of these ferromagnetic powders have been already known. The ferromagnetic powder used in the present invention can be manufactured by the known manufacturing method. The shape of the ferromagnetic powder may be any of acicular, granular, cubic, rice-granular or plate-shaped. In particular, an acicular ferromagnetic powder is preferably used.

An example of a method of manufacturing a ferromagnetic metal powder incorporating cobalt and yttrium that is suitably employed in the present invention will be described. An example employing a starting material in the form of iron oxyhydroxide obtained by blowing an oxidizing gas into an aqueous suspension obtained by mixing a ferrous salt and an alkali will be given. The iron oxyhydroxide is preferably α-FeOOH. In the first manufacturing method, a ferrous salt is neutralized with an alkali hydroxide to obtain an aqueous suspension of $Fe(OH)_2$, and oxidizing gas is blown into the suspension to obtain acicular α-FeOOH. In the second manufacturing method, a ferrous salt is neutralized with an alkali carbonate to obtain an aqueous suspension of $FeCO_3$, and an oxidizing gas is blown into the suspension to obtain spindle-shaped α-FeOOH. The iron oxyhydroxide is preferably obtained by reacting an aqueous solution of the ferrous salt with an aqueous solution of an alkali to obtain an aqueous solution comprising ferrous hydroxide, and then oxidizing the ferrous hydroxide aqueous solution in air or the like. In this process, the salt of an alkaline-earth element such as Ni salt, Ca salt, Ba salt, or Sr Salt, as well as Cr salt, Zn salt, and the like may also be present in the ferrous salt aqueous solution. The suitable selection of such a salt affords control over the particle shape (axial ratio). Ferrous chloride, ferrous sulfate, and the like are preferred as the ferrous salt. Sodium hydroxide, ammonia water, ammonium carbonate, and sodium carbonate are preferred as the alkali.

Chlorides such as nickel chloride, calcium chloride, barium chloride, strontium chloride, chromium chloride, and zinc chloride are preferred as the salts that are also present in the ferrous salt aqueous solution.

When incorporating cobalt with iron, prior to introducing yttrium, an aqueous solution of a cobalt compound such as cobalt sulfate or cobalt chloride is admixed to a slurry of iron oxyhydroxide. After preparing a cobalt-containing slurry of iron oxyhydroxide, introduction can be accomplished by admixing an aqueous solution comprising an yttrium compound to the slurry and stirring. In addition to yttrium, it is possible to incorporate neodymium, samarium, praseodymium, lanthanum, and the like into the ferromagnetic powder. These can be incorporated using chlorides such as yttrium chloride, neodymium chloride, samarium chloride, praseodymium chloride, and lanthanum chloride; and nitrates such as neodymium nitrate, gadolinium nitrate, and the like. Two or more of these compounds may be employed in combination.

As is well known, ferromagnetic metal powders can be subjected to a slow oxidation treatment to form an oxide film on particle surfaces for chemical stability. The ferromagnetic metal powder may comprise small quantities of hydroxides or oxides. When carbon dioxide gas is contained in the gas employed during slow oxidation, carbon dioxide gas adsorbs onto a basic point of the surface of the ferromagnetic metal powder. Therefore, such carbon dioxide gas may be incorporated.

In order to lower the surface roughness of the magnetic recording medium, the average major axis length of the ferromagnetic metal powder usually ranges from 0.04 to 0.15 $\mu$m, preferably from 0.05 to 0.12 $\mu$m. The average acicular ratio usually ranges from 4 to 10, preferably from 4 to 8.

When the ratio of particles formed as single crystals to the total number of crystals is defined as a crystallization rate when observing the crystals among ferromagnetic metal powder particles, a crystallization rate of 30 to 100 percent is preferable and a crystallization rate of 35 to 100 percent is more preferable. The saturation magnetization $\sigma$ s of the ferromagnetic metal powder in the present invention is preferably equal to or greater than 100 A·m$^2$/kg, more preferably from 110 to 160 A·m$^2$/kg. The coercive force Hc of the ferromagnetic metal powder is preferably from 1,800 to 3,000 Oersteds (from $1.43 \times 10^5$ to $2.39 \times 10^5$ A/m), more preferably from 1,900 to 2,800 Oersteds (from $1.51 \times 10^5$ to $2.23 \times 10^5$ A/m).

These ferromagnetic metal powders may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307 and 46-39639; and U.S. Pat. Nos. 3,026,215, 3,031,341, 3,100,194, 3,242,005 and 3,389,014.

The moisture content of the ferromagnetic metal powder is preferably from 0.01 to 2 weight percent. The moisture content of the ferromagnetic metal powder is preferably optimized by means of the type of binder, described further below. The tap density of the ferromagnetic metal powder is preferably from 0.2 to 0.8 g/cc. At equal to or less than 0.8 g/cc, uniform slow oxidation of the ferromagnetic metal powder is possible and the ferromagnetic metal powder can be safely handled. Further, magnetization of the tape or the like that is obtained does not diminish over time. At equal to or greater than 0.2 cc/g, good dispersibility is achieved.

The above-described resin component, curing agent, and ferromagnetic powder are kneaded and dispersed in a solvent such as methyl ethyl ketone, dioxane, cyclohexanone, or ethyl acetate that is commonly employed in the preparation of magnetic coating materials to obtain a magnetic coating liquid. Kneading and dispersion may be conducted by the usual methods. Abrasives such as $\alpha$-Al$_2$O$_3$ and Cr$_2$O$_3$; antistatic agents such as carbon black; lubricants such as fatty acids, fatty esters, and silicone oil; dispersants; and other commonly employed additives and fillers may be incorporated in addition to the above-stated components.

Since polyurethane (1) or (2) is employed as a binder in the present invention, the chlorine content of the magnetic recording medium of the present invention can be lowered. Therefore, very little hydrochloric acid is generated and it is possible to effectively incorporate lubricants that are decomposed by hydrochloric acid, particularly esters lubricants, into the upper magnetic layer and/or lower layer, thus decreasing dropout and the like and improving running durability. Examples of lubricants preferably employed in the present invention are silicone oils such as dialkoxy polysiloxane (wherein alkoxy groups have 1 to 4 carbon atoms) and monoalkyl monoalkoxypolysiloxane (wherein an alkyl has 1 to 5 carbon atoms and an alkoxy has 1 to 4 carbon atoms); fatty esters comprising monobasic fatty acids having 12 to 20 carbon atoms and monohydric or polyhydric alcohols having 3 to 12 carbon atoms; alkyl phosphoric esters; saturated fatty acids having 10 to 22 carbon atoms; unsaturated fatty acids; and fatty acid amides.

Among them, the use of fatty esters is preferred. Examples of alcohols serving as starting materials for fatty esters are ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, sec-butylalcohol, and other monoalcohols; and ethylene glycol, diethylene glycol, neopentyl glycol, glycerin, sorbitan derivatives, and other polyhydric alcohols. Examples of fatty acids serving as starting materials for fatty esters are propionic acid, octanoic acid, 2-ethylhexanoic acid, lauric acid, myristic acid, stearic acid, palmitic acid, behenic acid, arachidic acid, oleic acid, linolic acid, linolenic acid, elaidic acid, palmitoleic acid, and other aliphatic carboxylic acids and mixtures thereof Specific examples of fatty esters are butyl stearate, secbutyl stearate, isopropyl stearate, butyl oleate, amyl stearate, 3-methylpropyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, dipropylene glycol monobutyl ether esterified with stearic acid, diethylene glycol dipalmitate, hexamethylene diol acylated with myristic acid to obtain a diol, oleates of glycerin, and various other ester compounds.

The combined use of fatty esters and fatty acids is preferred in the composition of the lubricant employed in the present invention. Saturated fatty acids (with 10 to 22 carbon atoms) that are solid at ordinary temperatures are examples of the fatty acid.

Branched or straight chains, cis and trans isomeric structures, and the branched positions of the starting material fatty acids and alcohols can be selected to further reduce the hydrolysis of fatty esters often produced when a magnetic recording medium is employed in high humidity. These lubricants can be added within a range of 0.2 to 20 weight parts per 100 weight parts of binder. In particular, fatty acids are usually employed in a proportion of 0.1 to 2.0 weight parts, preferably 0.3 to 1.5 weight parts, per 100 weight parts of ferromagnetic powder (in the magnetic upper or lower layer) or nonmagnetic powder (for the powder serving as the main component of the nonmagnetic lower layer). Fatty esters are usually employed in a proportion of 0.5 to 3.0 weight parts, preferably from 0.7 to 2.5 weight parts, per 100 weight parts of magnetic powder (in the magnetic upper or lower layer) or nonmagnetic powder (for the powder serving as the main component of the nonmagnetic lower layer).

The layer configuration of the magnetic recording medium of the present invention will be described below. The present invention is not specifically limited other than that a magnetic layer be positioned on a lower layer. The lower layer comprises nonmagnetic powder or ferromagnetic powder dispersed in binder. When nonmagnetic powder is selected as the main material, the lower layer is a nonmagnetic layer, and when ferromagnetic powder is selected as the main material, the lower layer is a magnetic layer. When the lower layer is a nonmagnetic layer, the lower layer is also referred to as the nonmagnetic lower layer, and when the lower layer is a magnetic layer, the lower layer is also referred to as the magnetic lower layer. When referring to both, the term lower layer is also employed. Both the lower layer and the magnetic layer positioned on the lower layer (also referred to as the "magnetic upper layer") may each be a single layer or a composite layer.

The nonmagnetic powder used in the nonmagnetic lower layer can be selected from inorganic compounds such as metal oxides, metal carbonates, metal sulfates, metal nitrides, metal carbides, metal sulfides and the like. Examples thereof are α-alumina having an α-conversion rate of 90 to 100 percent, β-alumina, γ-alumina, silicon carbide, chromium oxide, cerium oxide, α-iron oxide, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particular desirable are titanium dioxide, zinc oxide, iron oxide and barium sulfate. Even more preferred is titanium dioxide. The average particle diameter of these nonmagnetic powders preferably ranges from 0.005 to 2 $\mu$m, but nonmagnetic powders of differing particle diameter may be combined as needed, or the particle diameter distribution of a single nonmagnetic powder may be broadened to achieve the same effect. What is preferred most is a particle diameter in the nonmagnetic powder ranging from 0.01 to 0.2 $\mu$m. Particular preferred is the pH of the nonmagnetic powder between 6 and 9. The specific surface area of the nonmagnetic powder usually ranges from 1 to 100 m$^2$/g, preferably from 5 to 50 m$^2$/g, further preferably from 7 to 40 m$^2$/g. The crystallite size of the nonmagnetic powder preferably ranges from 0.01 to 2 $\mu$m. The oil absorption capacity using dibutyl phthalate (DBP) usually ranges from 5 to 100 ml/100 g, preferably from 10 to 80 ml/100 g, further preferably from 20 to 60 ml/100 g. The specific gravity usually ranges from 1 to 12, preferably from 3 to 6. The shape may be any of acicular, spherical, polyhedral, or plate-shaped. The surface of these nonmagnetic powders is preferably treated with $Al_2O_3$, $SiO_2$, $TiO_2$, $ZrO_2$, $SnO_2$, $Sb_2O_3$ and ZnO. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. The surface-treatment coating layer may be a porous layer, with homogeneity and density being generally desirable.

Carbon black can be added to the lower layer. Mixing carbon black achieves the known effects of lowering surface resistivity Rs, as well as yielding the desired micro Vickers hardness. Examples of types of carbon black that are suitable for use are furnace black for rubber, thermal for rubber, black for coloring and acetylene black. The specific surface area of carbon black usually ranges from 100 to 500 m$^2$/g, preferably from 150 to 400 m$^2$/g and the DBP oil absorption capacity usually ranges from 20 to 400 ml/100 g, preferably from 30 to 200 ml/100 g. The average particle diameter of carbon black usually ranges from 5 to 80 nm, preferably from 10 to 50 nm, further preferably from 10 to 40 nm. It is preferable for carbon black that the pH ranges from 2 to 10, the moisture content ranges from 0.1 to 10 percent and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, 3150B, 3250B, #3750B, #3950B, #950, #650B, #970B, #850B and MA-600; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd.

When the lower layer is a magnetic layer, an alloy primarily comprised of γ-Fe$_2$O$_3$, cobalt-modified γ-Fe$_2$O$_3$, or α-Fe, or CrO$_2$ may be employed as a ferromagnetic powder. The use of cobalt-modified γ-Fe$_2$O$_3$ is preferred. In the present invention, ferromagnetic powders of differing composition and/or magnetic characteristics are preferably selected for use in the magnetic lower layer and magnetic upper layer. For example, the coercive force Hc in the magnetic lower layer is preferably set lower than in the magnetic upper layer to improve long wavelength recording characteristics, so ferromagnetic iron oxide powder may be employed in the lower layer and ferromagnetic metal powder in the magnetic upper layer. Further, it is effective to set the residual magnetic flux density Br in the magnetic lower layer higher than in the magnetic upper layer.

Binders, lubricants, dispersing agents, additives, solvents, dispersion methods and the like suited to the magnetic upper layer may be adopted to the manufacture of the magnetic lower layer or nonmagnetic lower layer.

The support suitable for use in the present invention can be known films such as biaxially oriented polyethylene naphthalate, polyethylene terephthalate, polyamides, polyimides, polyamidoimides, aromatic polyamides, and polybenzooxazoles. Polyethylene naphthalate and aromatic polyamides are preferred. These supports may be subjected beforehand to corona discharge treatment, plasma treatment, adhesion-enhancing treatment and heat treatment. It is further desirable for a support suitable for use in the present invention to have a surface with good smoothness in the form of a center-surface average surface roughness falling within a range of 0.1 to 20 nm, preferably 1 to 10 nm, at a cutoff value of 0.25 mm. It is further desirable for these supports to have not only a low center-surface average surface roughness, but also to have no rough protrusions of 1 $\mu$m or greater.

In the method of manufacturing the magnetic recording medium of the present invention, for example, the lower layer coating liquid and the upper magnetic layer coating liquid are coated to the surface of the support during running to a thickness yielding a dry thickness of the upper magnetic layer preferably ranging from 0.02 to 0.08 $\mu$m, more preferably from 0.03 to 0.07 $\mu$m, and a dry thickness of the lower layer preferably ranging from 0.7 to 1.4 μm, more preferably from 0.9 to 1.2 μm. The lower layer coating liquid and the magnetic upper layer coating liquid may be coated sequentially or simultaneously.

Coating machines suitable for use in coating the magnetic coating material mentioned above are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters and the like. For example, "Recent Coating Techniques" (May 31, 1983), issued by the Sogo Gijutsu Center (K.K.) may be referred to in this regard.

The followings are examples of coating devices and methods applicable to the manufacture of the magnetic recording medium of the present invention.

(1) A method in which the lower layer is first applied with a coating device commonly employed to apply magnetic coating materials such as a gravure coating, roll coating, blade coating, or extrusion coating device, and the magnetic upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the magnetic upper layer and lower layer are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672; and (3) A method in which the magnetic upper layer and lower layer are applied nearly simultaneously using an extrusion coating apparatus with a backup roller as disclosed in Japanese Unexamined Patent Publication (KOKAI) Heisei No. 2-174965.

A backcoat layer (backing layer) may be provided on the surface of the support employed in the present invention on which the magnetic coating liquid is not applied. The backcoat layer is a layer that is provided by applying a backcoat layer-forming coating material comprising a binder and granular components such as abrasives and antistatic agents dispersed in an organic solvent on the surface of the support on which the magnetic coating liquid is not applied. Various inorganic pigments and carbon black may be employed as granular components. Nitrocellulose, phenoxy resin, vinyl chloride resin, polyurethane, and other resins may be employed singly or in combination as the binder. An adhesive layer may be provided on the coated surface of the magnetic coating liquid on the support and on the coated surface of the backcoat layer-forming coating material.

These coating layers can be dried after subjecting the ferromagnetic powder contained in the coating layer to magnetic orientation. After drying in this manner, the coating layer can be processed for surface smoothness. For example, super calender rolls or the like can be employed in the surface smoothness treatment. Processing the surface for smoothness eliminates voids generated by elimination of the solvent during drying and increases the fill rate of ferromagnetic powder in the magnetic layer, yielding a magnetic recording medium with good electromagnetic characteristics. The calendering rolls employed can be heat-resistant plastic rolls such as epoxy, polyimide, polyamide and polyamidoimide. Processing may also be conducted with metal rolls.

The magnetic recording medium of the present invention preferably has a surface with extremely good smoothness in the form of a centerline average surface roughness of 0.1 to 4 nm, more preferably 1 to 3 nm, at a cutoff value of 0.25 mm. A surface with such high smoothness can be achieved by selecting specific ferromagnetic powders and binders such as those set forth above, forming a magnetic layer, and calendering it as set forth above. Calendering is preferably conducted under the condition of a calender temperature of 60 to 100° C., preferably 70 to 100° C., and still more preferably 80 to 100° C., and a pressure of, usually, 100 to 500 kg/cm (980 to 4900 N/cm), preferably 200 to 450 kg/cm (1960 to 4410 N/cm), and more preferably 300 to 400 kg/cm (2940 to 3920 N/cm). Then, the laminate obtained by curing in this manner can be made into a desired shape. The magnetic recording medium thus obtained can be cut to a desired size for use by a cutting machine and the like.

In this manner, the polyurethane employed in the present invention comprises aliphatic dibasic acid and more branched aliphatic diol than in prior art as a polyol component, resulting in high solubility in solvent and good dispersibility of ferromagnetic powder. Since the concentration of urethane groups can be high, a higher Tg can be achieved than in prior art aliphatic urethane, improving running durability.

Further, the increase in the concentration of urethane groups, which are a hydrogen bonding component, improves the coating strength through the Tg and the like by increasing inter-molecular interaction in the dry coating, while dispersibility decreases due to decreased solubility in solvent and increased coating liquid viscosity. Since polyurethane (1) and (2) have high urethane group concentrations and aliphatic dibasic acid and branched aliphatic diols are employed as constituents of polyester polyol, they also have an advantage in that solubility in solvent is not decreased. This is thought to be the result of the prevention of association of polyurethane molecules in the coating liquid due to the presence of branched.

Embodiments

Embodiments of the present invention are given below to describe the present invention in greater detail. The "parts" indicated below denote "parts by weight" and the percentages denote "weight percentages".

SYNTHESIS EXAMPLE OF POLYURETHANE

The polyester polyol shown in Table 1, diol as a chain-extending agent shown in Table 2, and DEIS (dimethyl ester sulfoisophthalate) were dissolved in cyclohexanone under a nitrogen gas flow at 60° C. in a container equipped with reflux condenser and stirrer that had been backfilled in advance with nitrogen. The proportions are given as molar percentages in Table 1. The molecular weight was obtained as a hydroxyl group value. A 60 ppm quantity of di-n-dibutyltin dilaurate was then added as catalyst and dissolved for 15 min. 4,4'-diphenylmethane diisocyanate (MDI) was then added in a quantity shown in Table 2 and the mixture was reacted with heating for 6 hours at 90° C., yielding a polyurethane solution. The weight average molecular weight and glass transition temperature of the polyurethane obtained are given in Table 2.

TABLE 1

| Constituent | Type of polyester polyol | | | | |
|---|---|---|---|---|---|
| | a | b | c | d | e |
| Dibasic acid | | | | | |
| Adipic acid | 100 | 100 | 100 | 100 | 83 |
| sodium 5-sulfoisophthalate | | | | | 17 |
| Diol (branched) | | | | | |
| 2-ethyl-2-butyl-1,6-hexanediol | 70 | | | 60 | |
| 2-ethyl-2-butyl-1,3-propanediol | | 70 | | | |
| 2,2-diethyl-1,3-propanediol | | | 70 | | |
| 3-methyl-1,5-pentanediol | | | | | 100 |
| Diol (straightchain) | | | | | |
| 1,6-hexanediol | 30 | 30 | 30 | 40 | |
| Molecular weight | 620 | 620 | 650 | 610 | 1000 | parts of butyl stearate, 1 part of stearic acid, and 50 parts of methyl ethyl ketone. The mixture was then further stirred and mixed for 20 min and passed through a filter having a mean pore diameter of 1 μm to prepare a magnetic upper layer coating liquid.

(Nonmagnetic Lower Layer Coating Liquid)

Eighty-five parts of $\alpha$-$Fe_2O_3$ (average particle diameter: 0.15 μm; $S_{BET}$: 52 m$^2$/g, surface treated with $Al_2O_3$ and $SiO_2$; pH: 6.5 to 8.0) and 15 parts of carbon black (average particle diameter: 40 nm) were comminuted for 10 min in an open kneader. Next, 10 parts of polyurethane resin A (solid component), 1.7 parts of vinyl chloride resin (a compound obtained by adding sodium hydroxyethyl sulfonate to a copolymer of vinyl chloride/vinyl acetate/glycidyl methacrylate=86/9/5; $SO_3Na$ content=6×10$^{-5}$ eq/g; epoxy content=10$^{-3}$ eq/g; Mw: 30,000), and 60 parts of cyclohexanone were added and the mixture was kneaded for 60 min. Subsequently, 200 parts of methyl ethyl ketone/cyclohexanone=6/4 were added and the mixture was dispersed for 120 min in a sand mill. To this were added 2 parts of butyl stearate, 1 part of stearic acid, and 50 parts of methyl ethyl ketone. The mixture was stirred and mixed for 20 min and passed through a filter having a mean pore size of 1 μm to prepare the lower layer coating liquid.

TABLE 2

| Poly-urethane | Polyester polyol | | Chain-extending agent | | DEIS | Diisocyanate MDI | Urethane group concentration | Weight average molecular | Tg |
|---|---|---|---|---|---|---|---|---|---|
| | Type | Quantity | Type | Quantity (mole) | (mole) | (mole) | mmol/g | weight | (° C.) |
| A | a | 24 | 2-ethyl-1,6-hexanediol | 26 | 2 | 48 | 3.1 | 41000 | 84 |
| B | b | 23 | 2-ethyl-2-butyl-1,3-propanediol | 27 | 2 | 48 | 3.1 | 42000 | 72 |
| C | c | | 2,2-diethyl-1,3-propanediol | 25 | 2 | 48 | 3.0 | 39000 | 76 |
| D | d | | 2-ethyl-1,6-hexanediol | 26 | 2 | 48 | 3.1 | 41000 | 46 |
| E | e | | 2-ethyl-2-butyl-1,3-propanediol | 40 | 0 | 48 | 3.4 | 76000 | 63 |

[Embodiment 1]

(Magnetic Upper Layer Coating Liquid)

One hundred parts of ferromagnetic alloy powder (composition: Fe of 89 atomic percent, Co of 5 atomic percent, Y of 6 atomic percent; Hc: 2,000 Oersteds (1.59×10$^5$ A/m); crystallite size: 15 nm; $S_{BET}$: 59 m$^2$/g, average major axis length: 0.12 μm; average acicular ratio: 7; σs:150 A·m$^2$/kg) were comminuted for 10 min in an open kneader. Next, 10 parts of polyurethane A (solid component), 1.7 parts of vinyl chloride resin (a compound obtained by adding sodium hydroxyethyl sulfonate to copolymer of vinyl chloride/vinyl acetate/glycidyl methacrylate=86/9/5; $SO_3Na$ content=6×10$^{-5}$ eq/g; epoxy content=10$^{-3}$ eq/g; Mw: 30,000), and 60 parts of cyclohexanone were added and the mixture was kneaded for 60 min. Subsequently, 2 parts of abrasive ($Al_2O_3$) (average particle diameter: 0.3 μm), 2 parts of carbon black (average particle diameter: 40 nm), and 200 parts of methyl ethyl ketone/toluene=1/1 were added and the mixture was dispersed for 120 min. in a sand mill. To this were added 5 parts of polyisocyanate (solid component) (Coronate 3041 made by Nippon Polyurethane Co., Ltd.), 2

An adhesive layer in the form of polyester resin containing sulfonic acid was applied to the surface of a 4 μm aramid support using a coil bar to a dry thickness of 0.1 μm. The lower layer coating material that had been prepared was then applied to 1.0 μm and the magnetic upper layer coating material was immediately applied thereover to a dry thickness of 0.04 μm in simultaneous multilayer coating with a reverse roll. The nonmagnetic support that had been coated with the magnetic coating material was magnetically oriented with a 0.5 T (tesla) Co magnet and a 0.5 T solenoid magnetic while the magnetic coating material was still wet. The coated support was then calendered with a seven-stage all metal roll combination (speed: 100 m/min, linear pressure: 300 kg/cm (2,840 N/cm), temperature: 90° C.) and then slit to a width of 6.35 mm.

(Embodiments 2 to 6 and Comparative Examples 1 to 4)

Varying the type of polyurethane resin, the quantity of vinyl chloride resin added, and the coating thickness (when dry) of the magnetic layer and nonmagnetic layer as indicated in Table 3, the above were prepared by the same method as in Embodiment 1.

[Measurement Methods]

(1) Saturation Magnetic Flux Density φm

Magnetic characteristics were measured parallel to the orientation direction with an external magnetic field of 796 kA/m (10 kOe) using a vibrating sample magnetometer (made by Toei Kogyo Co.).

(2) C/N Ratio

A sample tape was recorded and reproduced using a drum tester (made by Koyo Seisakujo) at a recording wavelength of 0.5 μm and a head speed of 10 m/sec. The C/N ratios were evaluated relative to various sample tapes, with the C/N ratio of the tape of Embodiment 4 being adopted as 0 dB.

TABLE 3

| | Magnetic layer | | Nonmagnetic layer | | Saturation magnetic flux density φm (G · μm) | C/N (dB) |
|---|---|---|---|---|---|---|
| | Polyurethane | Thickness (μm) | Polyurethane | Thickness (μm) | | |
| Embodiment 1 | A | 0.04 | A | 1.0 | 200 | 1.0 |
| Embodiment 2 | A | 0.03 | A | 1.0 | 150 | 0.8 |
| Embodiment 3 | A | 0.06 | A | 1.0 | 300 | 0.5 |
| Embodiment 4 | A | 0.08 | A | 1.0 | 400 | 0.0 |
| Embodiment 5 | B | 0.04 | B | 0.7 | 200 | 1.0 |
| Embodiment 6 | C | 0.04 | C | 0.7 | 200 | 1.0 |
| Comp.Ex.1 | A | 0.02 | A | 1.0 | 100 | −0.5 |
| Comp.Ex.2 | A | 0.10 | A | 1.0 | 500 | −1.0 |
| Comp.Ex.3 | D | 0.04 | D | 0.7 | 200 | −0.6 |
| Comp.Ex.4 | E | 0.04 | E | 0.7 | 200 | −0.8 |

Evaluation Results

Embodiments 1 to 6, in which the saturation magnetic flux density φm fell within a range of 150 to 400 G·μm and a binder comprising a polyurethane corresponding to polyurethane (1) or (2) was employed in the magnetic layer and nonmagnetic layer, all had high C/N ratios and good electromagnetic characteristics.

Comparative Example 1, in which a binder comprising a polyurethane corresponding to polyurethane (1) was employed but in which the saturation magnetic flux density φm was 100 G·μm, and Comparative Example 2, which had a saturation magnetic flux density φm of 500 G·μm, both exhibited low C/N ratios and poor electromagnetic characteristics.

Comparative Examples 3 and 4, in which the saturation magnetic flux density φm fell within a range of the present invention but in which polyurethanes D and E were substituted for polyurethanes corresponding to polyurethane (1) or (2), both had greatly diminished C/N ratios and poor electromagnetic characteristics relative to Embodiments.

According to the present invention, a magnetic recording medium in which head saturation is prevented and good electromagnetic characteristics are achieved can be provided. The magnetic recording medium of the present invention suppresses the generation of hydrochloric acid gas, affords good long-term preservation properties, and is environmentally safe.

The present disclosure relates to the subject matter contained in Japanese Patent Application No. 2002-260301 filed on Sep. 5, 2002, which is expressly incorporated herein by reference in its entirety.

What is claimed is:

1. A magnetic recording medium comprising a lower layer comprising a nonmagnetic powder or a ferromagnetic powder and a binder and at least one magnetic layer having a thickness ranging from 0.02 to 0.08 μm thereover comprising a ferromagnetic powder and a binder on a support, wherein said binder comprised in the lower layer and/or magnetic layer comprises a polyurethane, said polyurethane is polyurethane (1) prepared from a chain extending agent, an organic diisocyanate, and a polyester polyol which comprises a dibasic acid component and a diol component, wherein the dibasic acid component comprises an aliphatic dibasic acid component and 70 molar percent or more of the diol component is derived from a diol having an alkyl branched side chain comprising two or more carbon atoms without a ring structure, or said polyurethane is polyurethane (2) prepared from a chain extending agent which comprises an alkyl branched aliphatic diol comprising three or more of total carbon atoms in a branched side chain per molecule, an organic diisocyanate, and a polyester polyol which comprises a dibasic acid component and a diol component, wherein the dibasic acid component comprises an aliphatic dibasic acid component and 70 molar percent or more of the diol component is derived from an alkyl branched aliphatic diol having a branched side chain of which total carbon atoms per molecule is two or more, and magnitude of saturation magnetic flux density (Φm) ranges from 150 to 400 G·μm.

2. The magnetic recording medium according to claim 1, wherein the magnetic layer and/or nonmagnetic layer further comprises an ester lubricant.

3. The magnetic recording medium according to claim 2, wherein the ester lubricant has a melting point of equal to or less than 10° C.

4. The magnetic recording medium according to claim 1, wherein the polyurethane has a weight average molecular weight (Mw) ranging from 30,000 to 70,000.

5. The magnetic recording medium according to claim 1, wherein the polyurethane has a weight average molecular weight (Mw) ranging from 40,000 to 60,000.

6. The magnetic recording medium according to claim 1, wherein the polyurethane has a glass transition temperature (Tg) ranging from 50 to 150° C.

7. The magnetic recording medium according to claim 1, wherein the polyurethane has a glass transition temperature (Tg) ranging from 70 to 120° C.

8. The magnetic recording medium according to claim 1, wherein the polyurethane has a glass transition temperature (Tg) ranging from 80 to 100° C.

9. The magnetic recording medium according to claim 1, wherein the polyurethane comprises a polar group selected from the group consisting of —$SO_3M$, —$OSO_3M$, —COOM, —P=O(OM)$_2$, —O—P=O(OM)$_2$, —$NR_2$, and —$N^+R_2R'COO^-$, where M denotes a hydrogen atom, alkali metal, or ammonium, and R and R' denote alkyl groups with 1 to 12 carbon atoms.

10. The magnetic recording medium according to claim 1, wherein the polyurethane has a urethane group concentration ranging from 3.0 to 4.0 mmol/g.

11. The magnetic recording medium according to claim 1, wherein the polyurethane has a urethane group concentration ranging from 3.3 to 3.7 mmol/g.

12. The magnetic recording medium according to claim 1, wherein said binder comprised in the lower layer and/or magnetic layer further comprises vinyl chloride resin.

13. The magnetic recording medium according to claim 1, wherein the magnitude of the saturation magnetic flux density (Φm) ranges from 175 to 375 G·μm.

14. The magnetic recording medium according to claim 1, wherein the magnitude of the saturation magnetic flux density (Φm) ranges from 200 to 350 G·μm.

15. The magnetic recording medium according to claim 1, wherein the magnetic layer has a thickness ranging from 0.03 to 0.07 μm.

16. The magnetic recording medium according to claim 1, wherein the magnetic layer has a magnetic flux density Bm ranging from 3,000 to 4,500 Gauss.

17. The magnetic recording medium according to claim 2, wherein the lubricant is a fatty ester.

18. The magnetic recording medium according to claim 3, wherein the lubricant is a fatty ester.

* * * * *